(12) United States Patent  
Bahl

(10) Patent No.: US 6,629,151 B1  
(45) Date of Patent: Sep. 30, 2003

(54) METHOD AND SYSTEM FOR QUERYING THE DYNAMIC ASPECTS OF WIRELESS CONNECTION

(75) Inventor: Paramvir Bahl, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/456,858

(22) Filed: Dec. 8, 1999

Related U.S. Application Data

(60) Provisional application No. 60/125,009, filed on Mar. 18, 1999.

(51) Int. Cl.[7] .............................. H04L 12/06; H04Q 7/30
(52) U.S. Cl. ........................ 709/250; 709/224; 709/223; 370/352; 370/353
(58) Field of Search .................................. 709/250, 230, 709/227, 223, 224; 370/352, 353; 375/297, 306, 326, 219, 239; 455/69, 86, 126

(56) References Cited

U.S. PATENT DOCUMENTS

| | | | | |
|---|---|---|---|---|
| 5,630,061 A | * | 5/1997 | Richter et al. | 709/227 |
| 5,790,940 A | * | 8/1998 | Laborde et al. | 455/69 |
| 6,226,680 B1 | * | 5/2001 | Boucher et al. | 709/230 |
| 6,434,187 B1 | * | 8/2002 | Beard et al. | 375/219 |

FOREIGN PATENT DOCUMENTS

| | | |
|---|---|---|
| EP | 529 269 | 3/1993 |
| EP | 0529269 A2 * | 3/1993 |
| EP | 548 939 | 6/1993 |
| EP | 0548939 A2 * | 6/1993 |
| EP | 565 229 | 10/1993 |
| EP | 789 468 | 8/1997 |
| EP | 851 700 | 7/1998 |
| EP | 0851700 A1 * | 7/1998 |
| EP | 0872979 A2 * | 10/1998 |
| EP | 872 979 | 10/1998 |
| JP | 10093500 * | 4/1998 |
| WO | WO 97/12491 * | 4/1997 |

OTHER PUBLICATIONS

XP002146572, "Extensions to NDIS for Wireless WANs", PCCA Standard STD–201, Mar. 8, 1996.*

E. Harris et al., *Technology Directions for Portable Computers*, Proceedings of the IEEE, vol. 83, No. 4, pp. 636–658, Apr. 1995.

A. Daraiseh et al., *Methods For Packet Combining in HARQ Systems Over Bursty Channels*, Mobile Networks and Applications 2, pp. 213–224, 1997.

M. Chuah et al., *Link Layer Retransmission Schemes for Circuit–Mode Data Over the CDMA Physical Channel*, Mobile Networks and Applications 2, pp. 195–211, 1997.

M. Zorzi et al., *Performance of ARQ Go–Back–N Protocol in Markov Channels with Unreliable Feedback*, Mobile Networks and Applications 2, pp. 183–193, 1997.

M. Zarki et al., *Editorial*, Mobile Networks and Applications 2, pp. 165–166, 1997.

H. Liu et al., *Error Control Schemes for Networks: An Overview*, Mobile Networks and Applications 2, pp. 167–182, 1997.

(List continued on next page.)

Primary Examiner—Zarni Maung
Assistant Examiner—Wen-Tai Lin
(74) Attorney, Agent, or Firm—Leydig, Voit & Mayer, Ltd.

(57) ABSTRACT

Interfaces between wireless network hardware and software can provide for wireless-specific functionality and allow software to take advantage of the unique capabilities of a wireless network. These interfaces can perform static queries, dynamic queries, or a request to set attributes. Static queries can be information which does not change depending on the wireless connection, dynamic queries will attempt to obtain information based on the current wireless connection maintained by the hardware, and setting attributes allows the software components to change parameters within the hardware components. Additionally, callback functions are provided to allow the wireless network hardware to alert software to key events.

24 Claims, 3 Drawing Sheets

OTHER PUBLICATIONS

Victor Bahl, *A Proposal for Enhancing NDIS For Local Area Wireless Networking*, Nov. 15, 1998.

M. Zorzi, *Energy Management in Personal Communications and Mobile Computing*, IEEE Personal Communications, vol. 5, No. 3, p. 10, Jun. 1998.

Microsoft Corporation, *NDIS: Chapter 1 NDIS Driver Upper–Edge Functions*, MSDN Library, Jul. 1999.

Microsoft Corporation, *NDIS: Chapter 2 NDIS Library Functions*, MSDN Library, Jul. 1999.

Microsoft Corporation, *NDIS: Chapter 3 NDIS Library Function References*, MSDN Library, Jul. 1999.

Microsoft Corporation, *NDIS: Chapter 4 NDIS Driver Lower–Edge Functions*, MSDN Library, Jul. 1999.

Microsoft Corporation, *NDIS: 5.9 Wireless Objects*, MSDN Library, Jul. 1999.

Microsoft Corporation, *Network Drivers: Chapter 1 General Network Architecture of Windows NT*, MSDN Library, Jul. 1999.

Microsoft Corporation, *Network Drivers: 1.3 Types of NIC Drivers*, MSDN Library, Jul. 1999.

J. Haartsen et al., *Bluetooth: Vision, Goals, and Architecture*, Mobile Computing and Communications Review, vol. 2, No. 4, pp. 38–45, Oct. 1998.

K. Negus et al., *HomeRF and SWAP: Wireless Networking for the Connected Home*, Mobile Computing and Communications Review, vol. 2, No. 4, pp. 28–37, Oct. 1998.

J. Jayapalan et al., *Impact of Data Requirements on Data Requirements on Digital Cellular Systems Across the Globe: Cellular Data Services Architecture and Signaling*, IEEE Personal Communications, pp. 44–55, Second Quarter 1994.

T. Liu et al., *Mobility Modeling, Location Tracking, and Trajectory Prediction in Wireless ATM Networks*, IEEE Journal on Selected Areas in Communications, vol. 16, No. 6, pp. 922–936, 08/98.

P. Bahl, *ARMAP—An Energy Conserving Protocol for Wireless Multimedia Communications*, Microsoft Corporation, 1998.

P. Bahl, *Supporting Digital Video in a Managed Wireless Network*, IEEE Communications Magazine, pp. 94–102, Jun. 1998.

A. Noerpel et al., *Wireless Local Loop: Architecture, Technologies and Services*, IEEE Personal Communications, pp. 74–80, Jun. 1998.

H. Woesner et al., *Power–Saving Mechanisms in Emerging Standards for Wireless LANs: The MAC Level Perspective*, IEEE Personal Communications, pp. 40–48, Jun. 1998.

N. Bambos, *Toward Power–Sensitive Network Architectures in Wireless Communications: Concepts, Issues, and Design Aspects*, IEEE Personal Communications, pp. 50–59, Jun. 1998.

J. Lorch et al., *Software Strategies for Portable Computer Energy Management*, IEEE Personal Communications, pp. 60–73, Jun. 1998.

E. Biglieri et al., *Coding and Modulation Under Power Constraints*, IEEE Personal Communications, pp. 32–39, Jun. 1998.

T. Meng et al., *Low–Power Signal Processing System Design for Wireless Applicatiions*, IEEE Personal Communications, pp. 20–31, Jun. 1998.

Y. Lin, *Book Reviews: Wireless Communication: The Interactive Multimedia CD–ROM*, IEEE Personal Communications, pp. 8–9, Jun. 1998.

L. Larson, *Radio Frequency Integrated Circuit Technology for Low–Power Wireless Communications*, IEEE Personal Communications, pp. 11–13, Jun. 1998.

P. Viscarola et al., *Windows NT Device Driver Development: NDIS Miniport Drivers*, MacMillan Technical Publishing: Indianapolis, Indiana, pp. 578–585, 1999.

European Telecommunications Standard, *Radio Equipment and Systems (RES): High Performance Radio Local Area Network (HIPERLAN) Type 1; Functional Specification*, Oct. 1996.

The Institute of Electrical and Electronics Engineers, Inc., *Part. 11: Wireless LAN Medium Access Control (MAC) and Physical Layer (PHY) Specifications*, IEEE Standards Board, Jun. 26, 1997.

Intel Corporation et al., *Advanced Configuration and Power Management Specifications*, Dec. 22, 1996.

"Extensions to NDIS for Wireless WAN's", PCCA Standard STD–201, Mar. 8, 2996.

\* cited by examiner

METHOD AND SYSTEM FOR QUERYING THE DYNAMIC ASPECTS OF WIRELESS CONNECTION

CROSS-REFERENCE TO RELATED APPLICATION

This application claims the benefit of U.S. Provisional Application Ser. No. 60/125,009 filed Mar. 18, 1999.

TECHNICAL FIELD

This invention relates generally to computer networking and, more particularly, relates to a enhancing the functionality of wireless networking.

BACKGROUND OF THE INVENTION

To provide the greatest compatibility between software and hardware components on a computer system, the operating system of the computer defines certain interfaces which can be accessed and used by the programmers of the software components and which are to be provided and supported by the designers of hardware components. Thus, by using the defined interface, the software component can be assured of compatibility with all of the hardware components which support the interface. Similarly, a hardware component providing a specific interface can be assured that software components will be able to locate and access the functionality provided by the hardware component through the interface.

Existing support for wireless networking, however, is lacking from the interfaces defined by modern operating systems, such as the MICROSOFT WINDOWS 98 brand and the MICROSOFT WINDOWS NT brand of operating systems, both from Microsoft Corporation. Software and hardware for wireless networks, especially Wireless Local Area Networks (WLANs), generally rely on operating system interfaces designed within the context of a wire-based network, such as a traditional wire-based Local Area Network (LAN). However, interfaces designed within the context of wire-based networks do not provide for the necessary communication between software and hardware to enable all of the functionality supported by wireless networking hardware. For example, the current interfaces do not provide sufficient information regarding transmission degradation to allow software components to adapt themselves for transmission over a wireless network. Similarly, current interfaces do not provide any mechanisms for determining the location of a user since such a concept does not have meaning within a wire-based network.

SUMMARY OF THE INVENTION

Accordingly, the present invention provides a method for communication between wireless network hardware components and software components which allows the software components to utilize and take advantage of wireless-specific features of the hardware components.

The present invention also provides a standard method for defining the functionality of wireless-specific features of hardware components.

Briefly, the present invention defines interfaces between wireless network hardware and software which provide for wireless-specific functionality in three areas: static queries, dynamic queries, and setting attributes. Static queries refer to information which does not change depending on the wireless connection. For example, the maximum raw bit rate which is supported by the hardware is a function of the hardware and does not change with each wireless connection the hardware makes. A query to determine the maximum raw bit rate supported would, therefore, be a static query. A dynamic query will attempt to obtain information based on the current wireless connection maintained by the hardware. For example, the identifier of the base station with which the wireless hardware is currently communicating is a value which can be obtained during a dynamic query. Setting attributes allows the software components to change parameters within the hardware components. Forcing the hardware to maintain a connection with a specific base station would be one example of setting an attribute.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
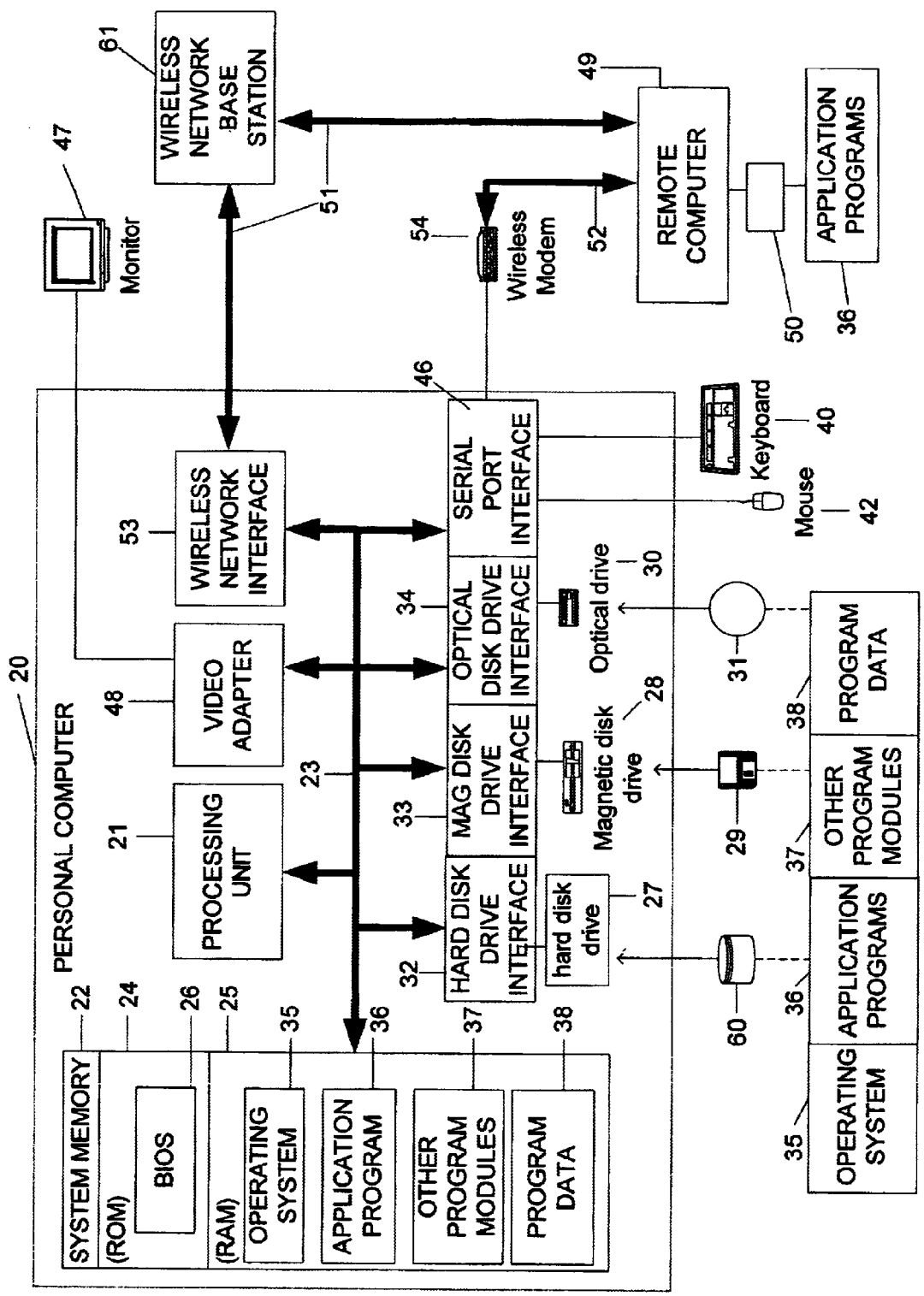
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a Wireless Local Area Network (WLAN) 51 and a Wide Area Network (WAN) 52. Such networking environments are commonplace in offices, enterprise-wide computer networks, intranets and the Internet.

When used in a WLAN networking environment, the personal computer 20 is connected to the wireless network 51 through a wireless network interface or adapter 53. When used in a WAN networking environment, the personal computer 20 typically includes a modem (not shown) or a wireless modem 54 or other means for establishing communications over the WAN 52. The wireless modem 54, which may be internal or external, is connected to the system bus 23 via the serial.port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
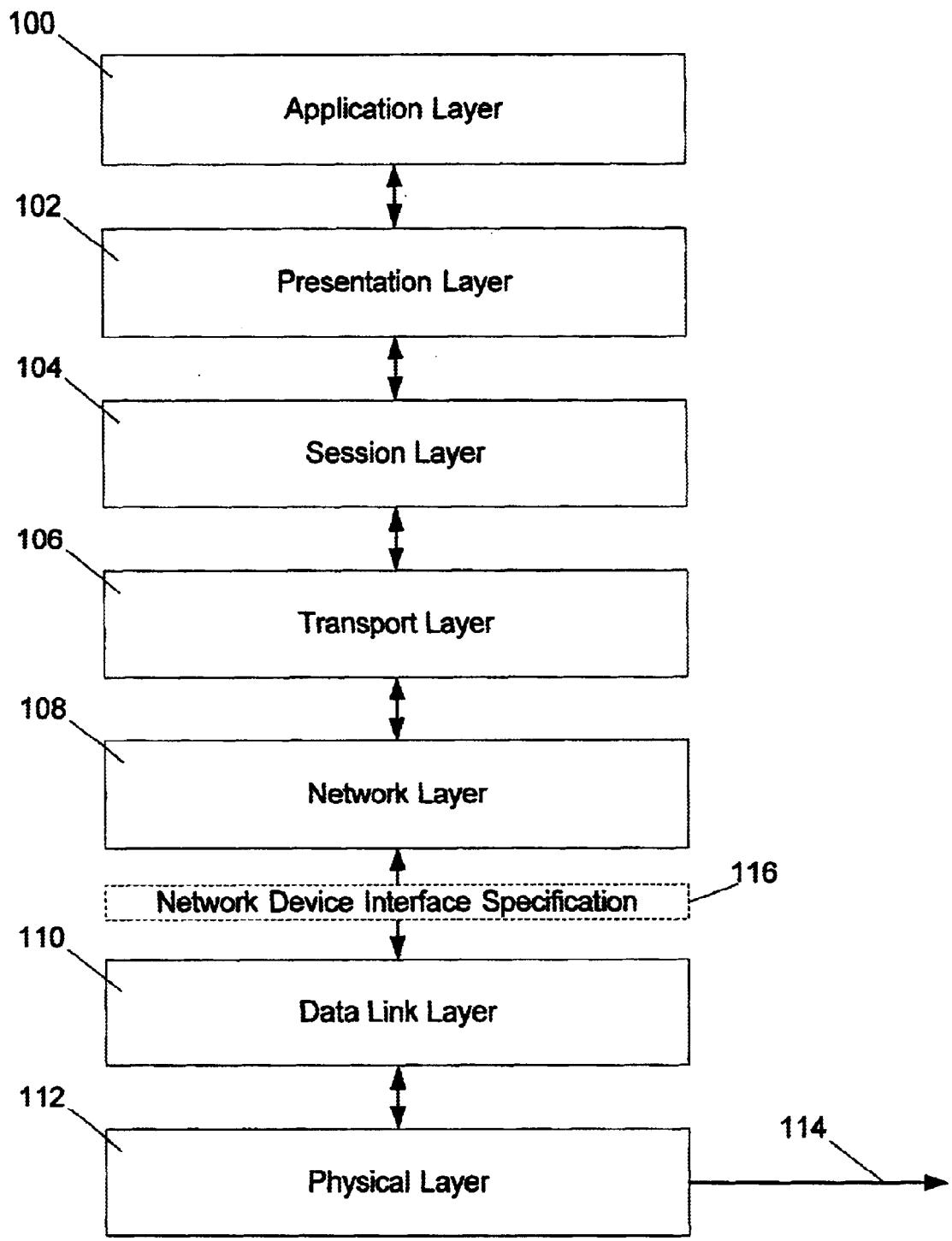
FIG. 2 is a block diagram generally illustrating the levels of an exemplary computer network on which the present invention resides.

In accordance with the invention, and turning to FIG. 2, the Open Systems Interconnection (OSI) seven-layer model is shown. This model is an industry standard abstraction of computer networking. The application layer 100 directly serves the end user and supports the software applications with which the user interacts. The presentation layer 102 provides the mechanisms which interpret data being sent from the application layer 100 on one computer to the application layer on another. The session layer 104 describes the organization of the data being transferred. The transport layer 106 acts as a final error correcting layer to ensure the data is delivered accurately, in the proper sequence, and with no loss or duplication. The network layer 108 defines the addressing and routing of the data across the network. It controls the operation of the local sub-network and decides which physical path the data should take, given network conditions, priority of service, and other factors. The data link layer 110 controls the transmission of blocks of data, or packets, across the network, and provides more fundamental error correction. The data link layer 110 is divided into two sublayers: the logical link control (LLC) sublayer and the media access control (MAC) sublayer. The LLC sublayer ensures error-free transmission of data frames by maintaining logical links, controlling frame flow, sequencing frames, acknowledging frames, and retransmitting unacknowledged frames. The MAC sublayer manages access to the network, checks frame errors and address recognition of the received frames. Protocols which include an LLC sublayer need only a minimal transport layer 106. Finally, the physical layer 112 carries the signals which are sent to the network connection 114. Generally, the physical layer 112 is implemented in the hardware connecting the computer 20 to the network connection 114.

A Network Device Interface Specification (NDIS) 116 can reside between the network layer 108 and the data link layer 110. The NDIS 116 can provide a library of interfaces between the software components and the hardware components. The NDIS 116 can define a fully abstracted environment for network interface card (NIC) driver development by providing routines for every external function that a NIC driver would need to perform. Thus, the NDIS 116 can provide interfaces for communication between a NIC driver and a overlying protocol driver and between a NIC driver and the underlying NIC hardware itself.

Generally the application layer 100, presentation layer 102, session layer 104, transport layer 106, and the network layer 108 are implemented in software components operating on a computer. The data link layer 110 and the physical layer 112 are generally implemented by the hardware components, such as a network interface card. The NDIS 116 library can be used by a software driver implemented in the transport layer 110 to communicate with a network interface card driver implemented at the data link layer 110. A transport layer driver generally implements a network protocol stack, such as the well known Transfer Control Protocol/Internet Protocol (TCP/IP) stack used on the Internet. If the transport layer software driver has a packet of data to be transmitted, it can call the NIC driver by means of an interface from the NDIS 116 library, and pass down the packet to be transmitted. Similarly, the NIC driver can use an interface of the NDIS 116 to pass the packet to the NIC itself for transmission across the network. The NDIS 116 interface can call the operating system specific components which perform the transmission at the NIC. The NDIS 116 interfaces can also be used by the NIC driver to communicate with the transport layer software driver and pass up a received packet of data, or other information.

Accordingly, the present invention contemplates additional interfaces in the NDIS 116 library, providing wireless-specific functionality. Wireless-specific functionality comprises functionality which would be most useful in a wireless environment, or which has a different use in a wireless environment, as opposed to a wire-based environment. For example, the location of a user may not be a useful parameter in a wired environment, because the user cannot move from his or her position due to the wired connection. However, in a wireless environment, the user's position can dynamically change as the user moves around, while still being connected to the network. Current interfaces provided in the NDIS 116 do not provide such wireless-specific functionality. The present invention, therefore, provides for wireless-specific functionality in three areas: static queries, dynamic queries, and setting attributes.

The present invention contemplates that software components will be able to determine the supported functionality of the wireless network connection hardware through a static query. Some examples of a static query, which will be described in greater detail below, are a determination of: the raw bit rate supported, link-layer acknowledgement support, controllable Forward Error Correction (FEC) support, handoffs between base station support, dynamic adaptation of transmission power support, and method of media acquisition.

Figure 3:
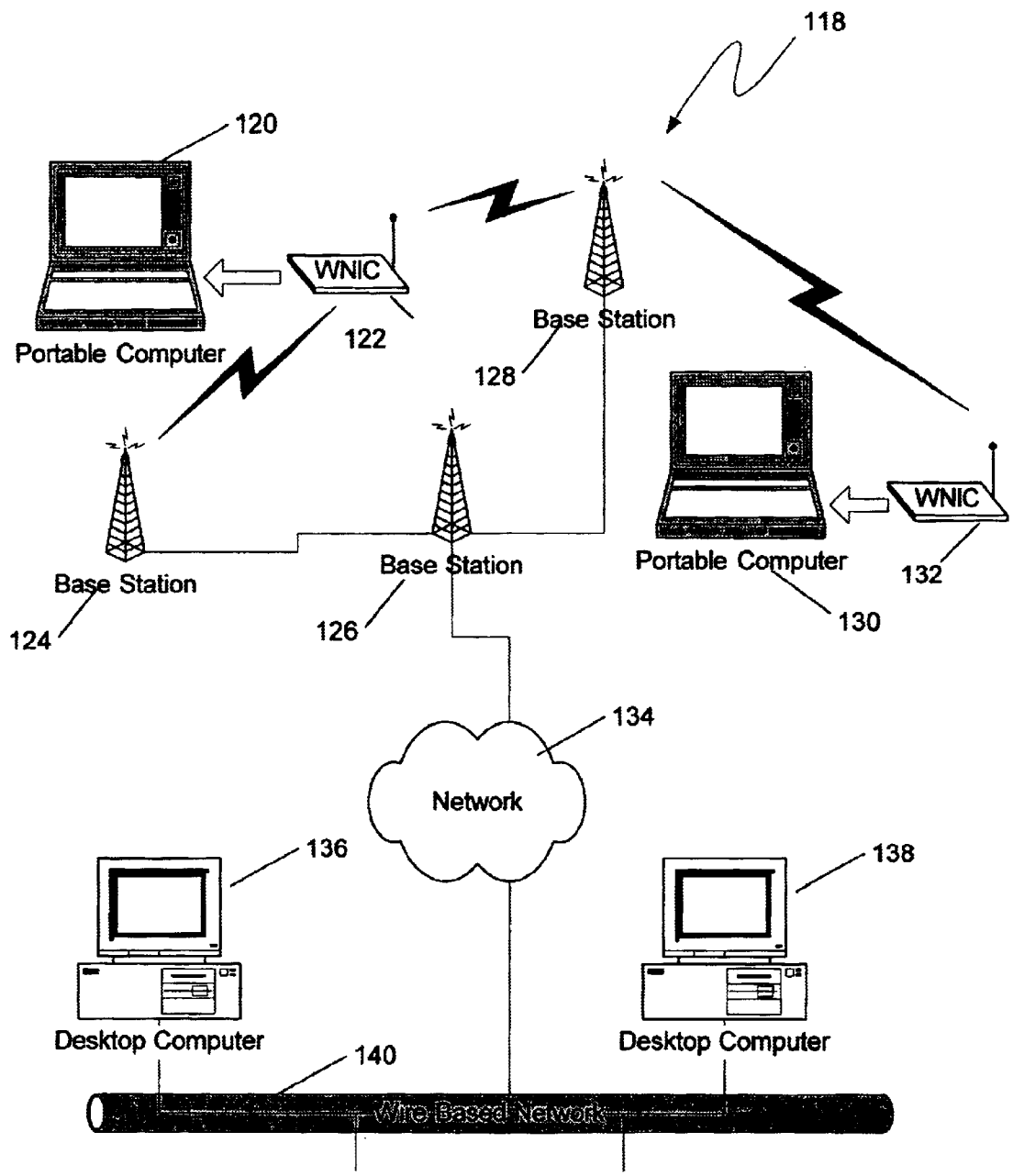
FIG. 3 is a block diagram generally illustrating an exemplary computer network within which the present invention operates.

Turning to FIG. 3, an exemplary WLAN 118 is shown. The WLAN 118 is also connected to another network 134, and to a wire-based network 140. A computer, such as portable computer 120 and portable computer 130 can link to the WLAN through a Wireless Network Interface Card (WNIC) 122 or a WNIC 132. The WNIC 122 can communicate, in a wireless fashion with a base station 124, base station 126, or base station 128. In addition, WNIC 122 can communicate with another WNIC 132 directly. As will be known by those of skill in the art, the maximum raw bit rate supported is a function of the hardware design of the WNIC 122. The bit rate is usually expressed in bits per second (bps). A static query to an interface supported by the WNIC 122 can provide the software component calling the interface with the raw bit rate supported.

One method for making such an interface call would be through the use of an NDIS 116 interface such as the NdisRequest interface. For example, on a MICROSOFT WINDOWS NT brand operating system from MICROSOFT corporation, the structure of a call to the NdisRequest interface can be as follows:

```
VOID
  NdisRequest(
    OUT PNDIS_STATUS Status,
    IN NDIS_HANDLE NdisBindingHandle,
    IN PNDIS_REQUEST NdisRequest
    );
```

As can be seen, the NdisRequest interface structure provides for an NdisBindingHandle input and a NdisRequest input. The NdisBindingHandle input identifies the target NIC, in this case the WNIC 122. The NdisRequest input is a pointer to a data structure, stored in a buffer, which specifies the operation being requested by the NdisRequest interface. Such a data structure is described in more detail below. The NdisRequest interface also provides for a Status output. Status is a pointer to a variable which contains a data structure returned by the WNIC 122 in response to the request made through the NdisRequest interface.

One example of a data structure which is provided as the NdisRequst input to the NdisRequest interface is the NDIS_REQUEST data structure, which can be of the following form:

```
typedef_struct _ NDIS_REQUEST {
    UCHAR                    MacReserved[16];
    NDIS_REQUEST_TYPE        RequestType;
    union _DATA {
        struct QUERY_INFORMATION {
            NDIS_OID         Oid;
            PVOID            InformationBuffer;
            UINT             InformationBufferLength;
            UINT             BytesWritten;
            UINT             BytesNeeded;
        } QUERY_INFORMATION;
        struct SET_INFORMATION {
            NDIS_OID         Oid;
            PVOID            InformationBuffer;
            UINT             InformationBufferLength;
            UINT             BytesWritten;
            UINT             BytesNeeded;
        } SET_INFORMATION;
    } DATA;
} NDIS_REQUEST, *PNDIS_REQUEST;
```

As can be seen, the NDIS_REQUEST data structure is comprised of a number of elements. MacReserved[16] is a 16-byte area reserved for use by the driver of the WNIC 122, InformationBuffer is a pointer to the buffer which will hold the value of the requested value, when the NWIC 122 returns it, InformationBufferLength is a pointer to the value indicating the length of the information buffer, BytesWritten is a pointer to the value indicating the number of bytes written by the request, and BytesNeeded is a pointer to the value indicating the number of bytes the request is expecting to be returned. The Oid, or ObjectIDentifier, specifies the object identifier of the operation being requested by the NdisRequest interface. The present invention contemplates a number of wireless specific object identifiers to request data specific to a wireless NIC, such as WNICs 122 and 132. The RequestType can be NdisRequestQueryInformation, NdisRequestSetInformation, or NdisRequestQueryStatistics.

An OID contemplated by the present invention, which can be used with the NdisRequest interface to request the raw bit rate supported by the WNIC 122 can be OID_WL_GEN_RAW_BIT_RATE. As is known by those of skill in the art, any OID can be used so long as it has been predefined and both the hardware and software components associate the same function with that OID. Generally, an OID is named with a given structure. For example, on a MICROSOFT WINDOWS NT brand operating system from MICROSOFT corporation, OID names are of the form OID_WL_YYY_XXX where the "OID" specifies that it is an OID and not a data structure, such as the NDIS_REQUEST data structure described above, the "WL" specifies that the OID is used in a wireless Local Area Networking context, "YYY" can be a set of characters to specify the type of OID, and "XXX" can be a descriptive name for the OID.

As was explained above, the OID is a defined term which provides to the WNIC 122 the lower level instructions for performing the requested operation. Therefore, the OID is generally implemented by the hardware manufacturer of the WNIC 122 generally in the form of a device driver. In such a manner a call to a specific OID can be relied upon by a software developer to perform a specific function, regardless of the underlying hardware. In the particular example provided, the OID OID_WL_GEN_RAW_BIT_RATE can pass a hardware level request to the WNIC 122 to return its raw bit rate supported, together with a pointer to a predefined data structure. While a data structure can be more complex, such as the NDIS_REQUEST data structure defined above, a simpler data structure can be provided to the WNIC 122 to return the raw bit rate supported. Such as simpler data structure can be of the form:

```
typedef struct_NDIS_WL_RAW_BIT_RATE
{
        ULONG      uRawBitRate
} NDIS_WL_RAW_BIT_RATE;
```

Where the uRawBitRate is an integer which can receive the raw bit rate supported from the WNIC 122.

As can be seen, to determine the raw bit rate supported by a WMC such as WNIC 122, an NDIS 116 interface, such as NdisRequest can be called. One of the inputs to the Ndis-Request interface will be the NDIS_REQUEST data structure, specifying the OID of the object and the buffer size and location where the raw bit rate is to be returned by the WNIC 116. The OID specified by the NDIS_REQUEST data structure, such as OID_WL_GEN_RAW_BIT_RATE, will indicate to the driver of the WNIC 122 the nature of the request being made by the software component, the nature and structure of the desired response, and the location at which to return the response. The driver of the WNIC 122 will then place, in the location specified by the OID, a value corresponding to the raw bit rate supported, in bps, in response to the software component making the interface call.

Another static query interface call which can be made by a software component is a query which determines whether the WNIC 122 supports link-layer acknowledgements. A link-layer acknowledgement is sent by the hardware and indicates that the most recent packet of information transmitted was received by the hardware and the hardware is ready to accept another packet. For example, in FIG. 3, communication between base station 124 and WNIC 122 can use link-layer acknowledgement if the base station 124 waited after each packet for the WNIC 122 to respond with an acknowledgement. Because link-layer acknowledgements can be implemented in hardware, it is appropriate for a software component to be able to determine whether the particular WNIC 122 supports link-layer acknowledgments.

As was described in more detail above, one method for calling such an interface would be to use an OID. An exemplary OID in the WINDOWS NT brand operating system can be of the form OID_WL_GEN_ACKS_SUPPORTED. An exemplary interface call to the interface in the NDIS layer 116 can use the NdisRequest interface, as above, providing as an input an NDIS_REQUST data structure containing OID_WL_GEN_ACKS_SUPPORTED as the OID. In the case of a query regarding the support of a particular feature by the hardware component, such as in the present example, the response to the query will often be a simple binary value indicating that the hardware either does, or does not, support the feature. Therefore, in the case of the query described above, the BytesNeeded elements of the NDIS_REQUEST data structure may well be less than one byte, since only one bit is needed to convey a true or false return.

In a like manner other static queries can be made from a software component to a hardware component, such as the WNIC 122. Another static query which can be useful in a wireless context is a query to determine if the WNIC 122 supports controllable Forward Error Correction (FEC). FEC, as will be known by those skilled in the art, allows the receiver to correct errors in received packets when the sender encodes error correction information into the packet. The more error correction information the packets contain, the less likely it is that the receiver will receive a packet so corrupted that it cannot correct it. However, additional error correction creates larger packets which require additional time to transmit across the network. Because current technology has not been able to provide the same throughput in a wireless network as in a wire-based network, larger packets can be a particular problem in a wireless network. A controllable FEC allows the WNIC 122 to send packets with little error correction information when there is less noise in the network to cause errors. In such a situation, faster network access is allowed. However, if there is greater noise in the system, possibly caused by other wireless hardware such as a microwave oven or other WNICs, the WNIC can control the amount of FEC and increase it, resulting in slower access, but maintaining the reliability of the connection. A query.by a software component to determine if controllable FEC is supported can be performed in an analogous manner to the query to determine if link-layer acknowledgements were supported, however, a different OID would also have to be used. One example of an OID for the query to determine if controllable FEC is supported can be OID_WL_GEN_CONTROL_FEC_SUPPORTED. The return buffer can contain either a true or false value in response to the query.

A wireless network connection allows a user the freedom to move around their environment. In order to do so, however, the WNIC 122 must be capable of supporting a handoff between two base stations, such as base stations 124 and 128 in FIG. 3. Thus, as the user moved from the vicinity of base station 124 to the vicinity of base station 128, the signal of base station 124 would become weaker and more prone to noise and error, and the signal of base station 128 would become stronger. When a certain threshold is reached, it becomes desirable for the WNIC 122 to communicate with base station 128 rather than base station 124. The ability of the WNIC 122 to end communication with base station 124 and start communicating with base station 128 without disconnecting the user from the network 118 is known as a handoff. A static query analogous to those described above, with a different OID, for example, OID_WL_GEN_BASESTATION_HANDOFF_SUPPORTED, can be used to determine if the WNIC 122 supports handoffs between base stations.

Because a wireless environment is most useful with a portable computer, such as portable computer 120, battery life can be a limiting factor. In an effort to reduce the power consumption of the WNIC 122, hardware manufacturers have developed cards which can adapt the transmission power dynamically. Thus, if the portable computer 120 is near base station 124, the WNIC 122 can reduce its transmission power and still maintain a high level of quality in the connection. As the portable computer is moved further from base station 124, the WNIC 122 can increase its transmission power to maintain a relatively error-free, and therefore fast connection. A software component can use a static query to determine if the WNIC 122 supports dynamically adaptable transmission power. Such a query could use an OID such as OID_WL_GEN_DYNAMIC_TX_POWER_SUPPORTED in the NDIS_REQUEST data structure as described in more detail above. The interface call can return a value indicating the range of adaptable transmission power if it was supported or a value such as 0 or −1 if it was not supported.

Wireless networking has given rise to a number of different methods of media acquisition. One of the unique aspects of wireless networking, is that an undetermined number of computers can be communicating with a single base station or can be communicating with each other directly over a common shared channel. To prevent the situation where two computers are simultaneously transmitting to a single base station, resulting in either or both of their communications being lost, a number of methods have been developed to acquire the base station's "ear". Such methods are known as media acquisition. One such method is Request To Send/Clear To Send (RTS/CTS). RTS/CTS requires that the WNIC 122 requests the base station 124 or another WNIC 132 to listen to it by broadcasting a request-to-send. When the base station, or the destination receiver, acknowledges with a clear-to-send (CTS), the WNIC 122 knows it is the only card communicating with the base station 124 at that time. Other methods, such as Direct Sequence Spread Spectrum (DSSS), Carrier Sense Multiple Access (CSMA), and Frequency Hopping Spread Spectrum (FHSS) are also known in the art. A static query can be used to call an interface which will return the type of media acquisition methods supported by the WNIC 122. The interface call can be made in a manner analogous to those described above. An example of an OID that can be used is OID_WL_GEN_MEDIA_ACQ. The interface call can then return, in the buffer provided, the types of media acquisition methods supported.

In addition to static queries, the interfaces of the NDIS 116 can support wireless-specific dynamic queries. A dynamic query, unlike a static query, can obtain information about the dynamic aspects of a wireless connection at a given instant in time. Thus, while the method of media acquisition used is a parameter of the WNIC 122 and is constant, the signal strength at any given time is a value which is continually changing, and is therefore appropriate for a dynamic request. Other wireless-specific values regarding the base station to which the WNIC is currently communicating which can also be obtained through a call to the appropriate interface in the NDIS 116, include: the noise floor at the transmitter, the base station MAC address, the base station identifier, and the frequency of the beacon signals. Additionally, for every incoming packet, the signal strength, the noise floor at the transmitter, the noise floor at the receiver, the MAC address of the transmitter, and the link-layer retransmission count can also be obtained. For every outgoing packet, the transmission power, the retransmission count, and the delay involved in acquiring the medium can be obtained. It is also useful for the software components to be able to access running average statistics maintained by the hardware components. Therefore, interface calls for the average throughput, Bit Error Rate (BER), medium acquisition delay, and percentage of beacons received can also supported by the NDIS 116. Finally, the software components can call specific interfaces to register a callback, so that the hardware components notify the software when a specific event occurs or a threshold value is reached. The interfaces for registering callbacks include registering for a callback when there is a failure to acquire the medium, when there is a failure to receive an acknowledgement, and when the hardware is connected to a specific base station.

As was described earlier, in a wireless system the user is passed between base stations as the user moves around. Such base stations are known as points of attachment. The wireless network performance is dependent on the current point of attachment, and it is, therefore, useful for software components to be able to access the information about a current point of attachment maintained. One element of information regarding the current point of attachment can be the signal strength of the current base station as received by the WNIC 122, also known as the Received Signal Strength Indicator (RSSI). When the portable computer 120 moves within the WLAN 118, it can be passed between base stations. As was explained earlier, as the portable computer 120 moves away from base station 124 and towards base station 128 it will be passed from one to the other. An often used measure to determine when a handoff between base stations would be appropriate is the RSSI of each base station as received by the WNIC 122.

A dynamic query can call an interface provided by the hardware in the NDIS 116 to request that the hardware provide the requested information. In a manner similar to a static query, an OID can be used to call the NdisRequest interface. For example, an OID for a dynamic query to determine the signal strength can be OID_WL_GEN_BASESTATION_RSSI. The call to the NdisRequest interface can pass parameters to allow the hardware to return the requested value, in the NDIS_REQUEST data format. One parameter which can be passed the OID. As in the case of a static query, the dynamic query above passes the OID which will indicate to the driver of the WNIC 122 the nature of the request being made by the software component. The driver of the WNIC 122 will then place, in the location specified by the request, a value corresponding to the RSSI, in decibel-milliWatts, in response to the interface call.

Another parameter which can be obtained from the driver of the WNIC 122 through an interface call to.the NDIS layer 116 is the noise floor at a base station. The noise floor is the lower limit of signal strength from the base station, beyond which the signal is indistinguishable from noise. The noise floor can be a used to determine the signal strength requirements, in the environment in which they operate and to determine when handoff to a different base station should occur. As before, one method for obtaining the noise floor from the hardware is by using an OID and making an interface call. An exemplary OID can be OID_WL_GEN_BASESTATION_NOISE_FLOOR. In a manner analogous to that described in more detail above, an interface call to the NDIS 116 can pass the OID and parameters describing the buffer where the hardware will return the noise floor at the base station in decibels.

Each base station, such as base station 124, base station 126, and base station 128 in FIG. 3, have a unique Media Access Control (MAC) layer address. The MAC address is generally set by the manufacturer of the base station, and is intended to be a permanent, unique identifier. Additionally, there is a base station identifier which helps to uniquely identify-base stations within a network and facilitate hand-offs between base stations. Each of these identifiers can be queried by a software component through an interface exposed in the NDIS 116. An OID, such as OID_WL_GEN_CURRENT_ACCESS_POINT, can be used to query the base station identifier of the base station. Similarly an OID, such as OID_WL_GEN_BASESTATION_PERMANENT_ADDRESS, can be used to query the MAC address of a base station. In either case, a call can be made in a manner analogous to that described above. The hardware can then return the address into the buffer specified in the call.

In a wireless network, such as WLAN 118, each of the base stations will transmit a beacon signal. The beacon signal allows the WNIC 122 to measure the signal strength of the base station, to synchronize with the base station, and to obtain information about the network and the base station, such as the load, and the number of users currently using the network or the particular base station. Thus, the WNIC 122 in FIG. 3 can communicate with base station 124, while simultaneously detecting the beacon signals from base stations 126 and 128. The frequency of the beacon signal of each base station can be different to prevent interference between the base stations. The frequency, in Hertz, of these beacon signals can be queried by through the NDIS layer 116, and the WNIC driver can return the frequency in Hertz. For example, an OID such as OID_WL_GEN_BASESTATION_BEACON_FREQUENCY can be used with an interface call, in a manner analogous to that described previously.

Each of the above elements: the RSSI, the noise floor, the MAC and Base Station Identifiers and the frequency of the beacon signal can be determined, not only for the base station with which the computer is currently communicating, but also for each base station which can be detected by the wireless interface. Therefore, when the hardware returns the result of the query, it is anticipated that the buffer may contain, either the value for the present point of connection, or a table of values for each of the base stations within range of detection. The methods described can accommodate either scenario, as the buffer which holds the returned information can be arbitrarily large. One method for determine which other base stations can be detected by the wireless interface is by using an NDIS interface call and passing, as the OID, OID_WL_NEIGHBORING_ACCESS_POINTS. This can return a list of the available base stations.

A dynamic query can also determine information about the individual packets which are sent and received by the wireless network hardware. One such element of information is the signal strength, in decibel-milliWatts, of each received packet. As has been described earlier, as the user moves around within the WLAN, the signal strength of the base station, detected by the WNIC 122 on the computer 120, will vary. An interface call supported by the NDIS 116 can provide the signal strength, of each packet received. One method of making such a call is to pass an OID and parameters in a manner analogous to that already described. An exemplary OID which can be used is OID_WL_GEN_RX_SIGNAL_STRENGTH. The hardware can then return, in the buffer provided, the signal strength in decibel-milliWatts for, either the most recent packet, or it can return a table containing the signal strength for a series of received packets.

The noise floor at the base station 129, and the noise floor at the WNIC 122 can also be obtained for each received packet. The noise floor, as described earlier, is the signal strength at which the signal is no longer distinguishable from the surrounding noise. As will be understood by one skilled in the art, the noise floor at the base station 124 and at the WNIC 122 can provide information on the quality of the connection at a particular location. The NDIS 116 can provide interfaces for software components to request from the hardware component the noise floor at both locations for the most recent packet received. As before, an OID can be used to call the interface. An OID such as OID_WL_GEN_RX_PACKET_NOISE_FLOOR can be used to request the noise floor at the base station and an OID such as OID_WL_GEN_TX_PACKET_NOISE_FLOOR can be used to request the noise floor at the WNIC. In either case, the hardware can return, in the buffer provided, either the value of the noise floor in decibels for the most recent packet received, or a table with the values of the noise floor for a series of received packets.

Each received packet contains the MAC-address of the base station which sent it. The MAC address, defined above, can be used to determine when the user has been handed off between one base station and another. The MAC address, because it identifies a base station whose location is fixed, can be used to approximate the location of the user within the WLAN 118. A software component can call an interface provided by the NDIS 116 to obtain the MAC address of the most recently received packet form the hardware. An interface call analogous to those described can be made by using an OID, such as OID_WL_GEN_RX_PACKET_PERMANENT_ADDRESS, to request the MAC address. The MAC address of the most recently received packet, or a table of MAC address for a series of recently received packets can then be placed in the buffer specified by the interface call.

One method for correcting errors in transmission is to use FEC, as described above. An alternative method is not to use FEC but instead to simply retransmit the packet if an error was detected. Such a method has the advantage of increasing the throughput of the network in situations where there is little noise or distortion. Therefore, a useful measure of the noise in the network is the link-layer retransmission count, or the number of times that the WNIC 122 asked the base station 124 to retransmit the packet. Given such information, the software could request that FEC be either used or not used. Furthermore, in the case of FEC being used, this information could help determine if FEC should be increased in a manner to be described in more detail below so that the transmission efficiency is improved in a noisy environment. An interface providing the link-layer retransmission count for the last received packet can be called using an OID such as OID_WL_GEN_RX_PACKET_NUM_RETRANSMITS, in a manner similar to those described above. The return buffer specified by the call can then contain either the number of retransmissions for the most recent packet, or for a series of recently received packets.

Different information can be obtained for packets which are transmitted by the hardware components. Because a wireless network is most useful when it is used to connect portable computers 120 and 130, battery conservation is an important concern. Thus, the transmission power of the WNIC 122 can be useful in determining how much longer the battery can last, and how much energy the WNIC 122 is using. The software component can query the transmission power of the most recent outgoing packet by calling an interface in the NDIS 116. An OID, which can be used when calling such an interface, can be OID_WL_GEN_TX_PACKET_POWER. The WNIC driver can return, in the buffer specified by the software component, the transmission power in Watts of the most recent packet, or a table of numbers indicating the transmission power for a series of packets.

The retransmission count, like the link-layer retransmission count explained above, can be an indication of the noise present in the wireless network. The retransmission count is the number of times the user's computer has had to retransmit a packet because the previous packet contained errors which could not be corrected. This is analogous the link-layer retransmission count, which is the number of times the user's computer had to ask for a packet to be retransmitted. The retransmission count can be obtained through an interface query, which can use an OID and additional parameters as described above. One OID which can be used is OID_WL_GEN_TX_PACKET_NUM_RETRANSMITS. The return buffer can then contain a number indicating the number of times the last packet had to be resent, or a table of numbers indicating the number of times a series of packets had to be resent.

Media acquisition, as was explained earlier, is the process by which a wireless network ensures that only one WNIC is communicating with a base station at any given time. The amount of time the WNIC must wait prior to acquiring the medium can be an indication of the congestion in the network. A software component can determine the wait time for the outgoing packet by using a dynamic query to access an interface provided by the NDIS 116. As above, an OID, such as OID_WL_GEN_TX_PACKET_MEDIUM_ACQUISITION_DELAY can be used in calling the interface. The delay involved in acquiring the medium for transmission for the most recent packet, or a table of delays for a series of packets, can be returned in a buffer specified when the interface was called.

In addition to being able to provide information regarding the individual packets being sent and received, the WNIC driver can also maintain and deliver to a software component continually updated "running" averages. One such average is the throughput of the present connection, in bits per second. A software component can query such a statistic by calling the NdisRequest interface in the NDIS 116. In some cases, the requests for running averages can be satisfied by the NDIS 116 itself. An example of an OID used in the NDIS_REQUEST data structure provided to the NdisRequest interface is OID_WL_GEN_PERFORMANCE_STATISTICS_THROUGHPUT.

When FEC is added to a packet, the bits received need not all be error-free for the packet to be read properly. The benefit of FEC, as will be known by those skilled in the art, is that the packet contains the necessary information to correct a certain amount of errors. Correcting an error, in a binary context, simply requires changing the bit from one state to another. The number of bits which have to be corrected is another indication of the noise in the wireless network. The Bit Error Rate (BER) is the number of bits which needed to be corrected divided by the total number of bits received. A high BER indicates an environment with a lot of noise. The BER can be obtained by calling an interface in the NDIS layer 116. A method analogous to that described in detail above can be used. An OID, such as OID_WL_GEN_PERFORMANCE_STATISTICS_BER, can be used, together with parameters indicating the buffer into which the BER, as a percentage, can be returned.

The delay in acquiring the medium, as was explained above, is an indication of the congestion of the system. The average delay in acquiring the medium can be useful as a predictor of future delays and as an indicator of past congestion. An interface call supported by the NDIS 116 can obtain the average delay for acquiring the medium. One method for making such a call requires passing an OID and parameters, as described above. An OID which can be used in the call can be OID_WL_GEN_PERFORMANCE_STATISTICS_MEDIUM_ACQUISITION_DELAY. The buffer passed in the call will hold, on return, the average medium acquisition delay in milliseconds.

The beacon signal of a base station, as previously described, can also serve as an indicator of the reliability of the receipt of signals from that base station. For example, as the portable computer 120 and WNIC 122 in FIG. 3 increase their distance from base station 124, the beacon signals from base station 124 will get weaker. A weak signal may not be received at all. Therefore, as the signals from base station 124 get weaker, more and more beacons will not be received properly, or at all, and will be ignored by the WNIC 122. An indication of the reliability of the transmission from the base station 124 is the percentage of beacon signals which have been received properly. Because the WNIC 122 can determine the number of signals it should have received by reference to the frequency of beacon signal transmissions, it can determine the percentage of beacon signals received. A software component can obtain this information by calling the appropriate interface in the NDIS 116, as described above. An OID which can be used in calling the interface is OID_WL_GEN_PERFORMANCE_STATISTICS_BEACONS_RECEIVED. The driver will return, in the buffer specified, the ratio of the number of beacons received to the number of beacons that should have been received over a period of time since the last invocation of this call. Alternatively, an analogous interface can determine the percentage of beacons dropped.

Communication through the NDIS 116 is not limited to requests made by software components. It can be advantageous to provide a mechanism for allowing the hardware components to register a callback to the software, to inform the software of specified events. One example of an event which can be detected by the WNIC driver and then communicated to software components is the failure to acquire the medium. In such a case, the software will be able to prompt the user that transmission could not be completed, rather than simply waiting for the hardware to perform a transmission it could never complete. A callback can also be an interface in the NDIS 116. In this case, the interface would be called by the WNIC 122 driver, and no reply from the software component would be necessary. One method for calling a callback interface would be to use an OID. For example, an OID which can be used to perform a callback when the medium for transmission cannot be acquired can be: OID_WL_GEN_INDICATION_REQUEST_MEDIUM_NOT_ACQUIRED.

Another failure which can be communicated to the software components through a callback is the failure to receive an acknowledgement packet from the receiving base station. As was explained, an acknowledgement is an indication that the last packet sent was received properly. Without an acknowledgement, the sender does not know whether to send the next packet, or retransmit the previous one. Generally, the previous packet will be retransmitted after a certain amount of time. However, if the sender is not detecting any acknowledgements, the transmission will halt. The driver of the WNIC 122 can notify software components of failures to receive acknowledgements through an interface call analogous to the callback described above. An OID which can be used to make such a call can be OID_WL_GEN_INDICATION_REQUEST_ACK_NOT_RECEIVED. The buffer specified by the callback will contain the message from the hardware to the software layer indicating the failure to receive an acknowledgement.

Because the rates charged to users may vary depending on the user's location, it is often advantageous to notify the user when the user is in their "home area". Therefore, another callback provided by the NDIS 116 allows the driver of the WNIC 122 to notify software components when the WNIC is communicating with a given base station, known to be in the "home area" or other area of interest. The callback can be accessed by using an OID, such as OID_WL_GEN_INDICATION_REQUEST_ATTACH_POINT, in a manner similar to that described above. A callback to indicate that communication with the particular base station has ended can also be designed in an analogous manner.

In addition to static and dynamic calls, the NDIS 116 also supports calls which allow the software components to change or set the attributes of the hardware components. For example, a software component can instruct a WNIC 122 to communicate with base station 124 only. Forcing a point of attachment can be accomplished through an interface call supported by the NDIS 116. One method for performing such an interface call involves sending an OID, such as OID_WL_SET_POINT_OF_ATTACHMENT, together with parameters. As was defined above, the NDIS_REQUEST data structure provides a format for both QUERY_INFORMATION and SET_INFORMATION. In the present example, the format defined for SET_INFORMATION can be used.

The WNIC 122, as was explained above, can be queried to determine whether it supports controllable FEC. If controllable FEC is supported, it can be controlled, and turned on and off, through an appropriate interface in the NDIS 116. One method for calling such an interface is by using an OID, such as OID_WL_GEN_SUPPORTED_FEC_LEVELS. The driver of the WNIC 122 can return, in the buffer provided, an acknowledgement of the command.

Because the portable computer 120 in FIG. 3 generally is powered by a battery of limited capability, power conservation is an important concern. As was explained earlier, the WNIC 122 can provide information to software components regarding its transmission power. An interface can also be provided for adjusting the power levels to increase efficient use of the battery's power. For example, instructing the WNIC 122 to go to a standby mode where it uses less power, or to wake up from a standby mode when communication with the WLAN 118 is required can be accomplished through an interface call supported by the NDIS 116. One method of accessing these interfaces is by calling them using an OID, such as OID_WL_GEN_STANDBY. The driver of the WNIC 122 can then return an acknowledgement of the command in the buffer provided by the interface call.

Wireless networking standards are designed to let a WNIC 122 operate at several different data rates. In general, the rate at which a WNIC 122 operates is determined by the amount of packet errors it is incurring and its distance from the base station 124. When the WNIC is close to the base station and there are only a few packets which are received with errors, it is desirable to operate the WNIC at a higher data rate. However when the distance between the base station 124 and WNIC 122 is large or the number packet errors high, it is better if the WNIC 122 operates at a lower data rate. It is therefore useful to be able to monitor the link characteristics with OIDs such as those described previously and to be able to instruct the. WNIC 122 to operate at a particular data rate. One method of setting the data rate of the WNIC 122 is by calling an-OID, such as OID_WL_GEN_SET_DATA_RATE, and passing the WNIC 122 a parameter containing the data rate in millions of bits per second.

Wireless networking hardware can be configured to operate in either an infrastructure mode, where the WNIC 122 connects to a base station 124 and sends and receives all its packets from it, or in an ad hoc mode, where the WNIC 122 does not connect to a base station 124 but is able to send and receive packets to another WNIC 132 directly. When two or more WNIC are close to one other, and they want to communicate with each other, it is useful to configure them for ad hoc connectivity so that packets can be sent and received directly rather than passing through the base station 124. This can optimize the bandwidth needed for delivering packets between the two WNICs and reduce the delivery time of these packets. One method of setting the WNIC to ad hoc connectivity mode or to infrastructure connectivity mode is by calling an OID, such as OID_WL_GEN_SET_NETWORK_MODE, and passing it a parameter instructing the WNIC 122 to configure itself as an infrastructure mode or to configure itself as an ad hoc network.

As can be seen, a number of wireless-specific interfaces have been provided in the NDIS. The interfaces can be used in either a static query, a dynamic query, or a set request. Additionally, callbacks can be used to convey information from the hardware components to the software components.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of wireless-specific communication between a wireless network hardware component connected to a computer and a software component on the computer, the method comprising: calling an interface to the wireless network hardware component; providing the interface with an input, wherein the input specifies the location of a parameter and wherein the input includes an object identifier, wherein the object identifier specifies a wireless-specific query from the software component to the wireless network hardware component requesting a wireless-specific dynamic query data for a packet; and receiving a wireless-specific dynamic query response for the packet from the wireless network hardware component wherein, for the packet, the dynamic query is performed to obtain information about the dynamic aspects of the wireless connection at any instant in time.

2. The method of claim 1 wherein, the wireless-specific query requesting the wireless-specific dynamic query data on the packet-by-packet basis is a request for a media access control layer address a transmitter of an incoming packet received by the wireless network hardware component.

3. The method of claim 2 wherein, the transmitter is a point of attachment.

4. The method of claim 1 wherein, the wireless-specific query requesting the wireless-specific dynamic query data on the packet-by-packet basis is a request for a base station identifier of a transmitter of an incoming packet received by the wireless network hardware component, wherein the transmitter is a point of attachment.

5. The method of claim 1 wherein, the wireless-specific query requesting the wireless-specific dynamic query data on the packet-by-packet basis is a request for a frequency of a beacon signal of a transmitter of an incoming packet received by the wireless network hardware component, wherein the transmitter is a point of attachment.

6. The method of claim 1 wherein, the wireless-specific query requesting the wireless-specific dynamic query data on the packet-by-packet basis is a request for a link-layer retransmission count of an incoming packet received by the wireless network hardware component.

7. The method of claim 1 wherein, the wireless-specific query requesting the wireless-specific dynamic query data on the packet-by-packet basis is a request for a transmission power of an outgoing packet sent by the wireless network hardware component.

8. The method of claim 1 wherein, the wireless-specific query requesting the wireless-specific dynamic query data on the packet-by-packet basis is a request for a retransmission count of an outgoing packet sent by the wireless network hardware component.

9. The method of claim 1 wherein, the wireless-specific query requesting the wireless-specific dynamic query data on the packet-by-packet basis is a request for a delay in acquiring a medium of transmission of an outgoing packet sent by the wireless network hardware component.

10. The method of claim 1 wherein, the wireless-specific query requesting the wireless-specific dynamic query data on the packet-by-packet basis is a request for a running average throughput of a packet, wherein the running average throughput requested is a running average throughput of a wireless communication connection by the wireless network hardware component, and wherein the packet is either an incoming packet received by the wireless network hardware component or an outgoing packet sent by the wireless network hardware component.

11. The method of claim 1 wherein, the wireless-specific query requesting the wireless-specific dynamic query data on the packet-by-packet basis is a request for a running average bit error rate of a packet, wherein the running average bit error rate requested is a running average bit error rate of a wireless communication connection by the wireless network hardware component, and wherein the packet is either an incoming packet received by the wireless network hardware component or an outgoing packet sent by the wireless network hardware component.

12. The method of claim 1 wherein, the wireless-specific query requesting the wireless-specific dynamic query data on the packet-by-packet basis is a request for a running average medium acquisition delay of a packet, wherein the running average medium acquisition delay requested is a running average medium acquisition delay of a wireless communication connection by the wireless network hardware component, and wherein the packet is either an incoming packet received by the wireless network hardware component or an outgoing packet sent by the wireless network hardware component.

13. A computer-readable medium having computer-executable instructions for performing wireless-specific communication between a wireless network hardware component connected to a computer and a software component on the computer, the communication comprising the steps of: calling an interface to the wireless network hardware component; providing the interface with an input, wherein the input specifies the location of a parameter and wherein the input includes an object identifier, wherein the object identifier specifies a wireless-specific query from the software component to the wireless network hardware component requesting the wireless-specific dynamic query data for a packet, and receiving a wireless-specific dynamic query response for the packet from the wireless network hardware component wherein, for the packet, the dynamic query is performed to obtain information about the dynamic aspects of the wireless connection at any instant in time.

14. The computer-readable medium of claim 13 wherein, the wireless-specific query requesting the wireless-specific dynamic query data on the packet-by-packet basis is a request for a media access control layer address a transmitter of an incoming packet received by the wireless network hardware component.

15. The computer-readable medium of claim 14 wherein, the transmitter is a point of attachment.

16. The computer-readable medium of claim 13 wherein, the wireless-specific query requesting the wireless-specific dynamic query data on the packet-by-packet basis is a request for a base station identifier of a transmitter of an incoming packet received by the wireless network hardware component, wherein the transmitter is a point of attachment.

17. The computer-readable medium of claim 13 wherein, the wireless-specific query requesting the wireless-specific dynamic query data on the packet-by-packet basis is a request for a frequency of a beacon signal of a transmitter of an incoming packet received by the wireless network hardware component, wherein the transmitter is a point of attachment.

18. The computer-readable medium of claim 13 wherein, the wireless-specific query requesting the wireless-specific dynamic query data on the packet-by-packet basis is a request for a link-layer retransmission count of an incoming packet received by the wireless network hardware component.

19. The computer-readable medium of claim 13 wherein, the wireless-specific query requesting the wireless-specific dynamic query data on the packet-by-packet basis is a request for a transmission power of an outgoing packet sent by the wireless network hardware component.

20. The computer-readable medium of claim 13 wherein, the wireless-specific query requesting the wireless-specific dynamic query data on the packet-by-packet basis is a request for a retransmission count of an outgoing packet sent by the wireless network hardware component.

21. The computer-readable medium of claim 13 wherein, the wireless-specific query requesting the wireless-specific dynamic query data on the packet-by-packet basis is a request for a delay in acquiring a medium of transmission of an outgoing packet sent by the wireless network hardware component.

22. The computer-readable medium of claim 13 wherein, the wireless-specific query requesting the wireless-specific dynamic query data on the packet-by-packet basis is a request for a running average throughput of a packet, wherein the running average throughput requested is a running average throughput of a wireless communication connection by the wireless network hardware component, and wherein the packet is either an incoming packet received by the wireless network hardware component or an outgoing packet sent by the wireless network hardware component.

23. The computer-readable medium of claim 13 wherein, the wireless-specific query requesting the wireless-specific dynamic query data on the packet-by-packet basis is a request for a running average bit error rate of a packet, wherein the running average bit error rate requested is a running average bit error rate of a wireless communication connection by the wireless network hardware component, and wherein the packet is either an incoming packet received by the wireless network hardware component or an outgoing packet sent by the wireless network hardware component.

24. The computer-readable medium of claim 13 wherein, the wireless-specific query requesting the wireless-specific dynamic query data on the packet-by-packet basis is a request for a running average medium acquisition delay of a packet, wherein the running average medium acquisition delay requested is a running average medium acquisition delay of a wireless communication connection by the wireless network hardware component, and wherein the packet is either an incoming packet received by the wireless network hardware component or an outgoing packet sent by the wireless network hardware component.

* * * * *

UNITED STATES PATENT AND TRADEMARK OFFICE
CERTIFICATE OF CORRECTION

PATENT NO.    : 6,629,151 B1  
DATED         : September 30, 2003  
INVENTOR(S)   : Bahl It is certified that error appears in the above-identified patent and that said Letters Patent is hereby corrected as shown below:

Column 3,
Line 66, "serial.port" should read -- serial port --.

Column 7,
Line 37, "WMC" should read -- WNIC --.

Column 8,
Line 40, "query.by" should read -- query by --

Column 10,
Line 51, "to.the" should read -- to the --.

Column 12,
Line 21, "MAC-address" should read -- MAC address --.

Column 15,
Line 67, "the. WNIC" should read -- the WNIC --.

Column 16,
Line 2, "an-OID" should read -- an OID --.

Signed and Sealed this

Thirtieth Day of March, 2004

JON W. DUDAS
*Acting Director of the United States Patent and Trademark Office*